July 14, 1931. A. C. ESTEP 1,814,622
VALVE ACTUATING AND CONTROLLING MECHANISM
Filed Jan. 27, 1926 5 Sheets-Sheet 5

INVENTOR
Adrian C. Estep.
BY
James E. Sproll
ATTORNEY

Patented July 14, 1931

1,814,622

UNITED STATES PATENT OFFICE

ADRIAN C. ESTEP, OF SEATTLE, WASHINGTON

VALVE ACTUATING AND CONTROLLING MECHANISM

Application filed January 27, 1926. Serial No. 84,005.

This invention relates to novel actuating and controlling mechanisms for fuel injection valves, wherethrough heavy or tarry fluid fuels are fed under high pressure to the combustion chambers of high compression internal combustion engines, and the primary aim and object of the invention is the provision of a fuel injection valve actuating and controlling mechanism to periodically open the correlated valve or lift the valve stem thereof and to adjustably regulate and control the opening of said valve or lift of said valve stem by action of the engine governor, whereby the injection or spraying of fluid fuel within and throughout the combustion chamber of the associated engine cylinder is regulated as to time of occurrence and quantity to maintain the engine at a predetermined and substantially uniform speed or power output.

With these ends in view the invention consists in apparatus embodying a fuel injection valve for an internal combustion engine which is periodically opened or lifted; in cam actuating mechanism driven by the engine for effecting the opening or lifting movements of the valve; in mechanism operable by the engine governor and interposed between the valve and the cam mechanism to regulate and control the opening or lifting movements of the valve by action of the engine governor; in mechanism to vary and adjust the range of compression of the engine governor spring and to set the same for a predetermined and selected minimum engine speed; in manually adjustable mechanism to vary the spring load upon the engine governor whereby the action of same is regulated and controlled for any selected engine speed or power output between minimum and maximum engine speeds based upon the minimum engine speed setting of the engine governor spring; and in manually operable means interposed between the valve and governor controlling mechanism to cut in or cut out the valve at will.

The invention further consists in the novel construction, combination, adaptation and arrangement of parts, as will hereinafter be more fully described and succinctly defined in the claims appended hereto.

Referring to the accompanying drawings, wherein is illustrated the preferred embodiment of the invention—

In the present disclosure, I have elected to illustrate and described the valve actuating and controlling mechanism, of the invention, employed in combination with the fuel injection valve of a high compression internal combustion engine, but manifestly such mechanism may be utilized and employed with other types of valves, or in any capacity, wherein periodic and variable actuation under governor regulation and control is essential and desirable, without departing from the spirit of the invention, or the benefits derivable therefrom, the present showing being merely by way of illustration.

In the drawings and description similar reference characters designate similar parts throughout the several views.

The numeral 1 designates an engine crank case whereon a waterjacketed engine cylinder, or cylinders, 2 are rigidly secured, each having a piston 3 fitted for reciprocation therein, the upper end of which at top dead center projects within the concentrically recessed lower end of a water-jacketed cylinder head structure 4 suitably secured or bolted in axial alignment upon the upper end of the engine cylinder 2, whereat the said recessed lower end in conjunction with the upper end of the piston 3 periodically serve or function as a combustion space or chamber for said engine cylinder.

Mounted upon and embodied within the cylinder head structure 4 is the valve controlling system of the engine cylinder 2 comprising a concentrically mounted fuel injection or spray valve 5, an air inlet valve 6, an exhaust valve 7, a starting air timing valve 8 interconnected with the combustion air intake passageway of the air inlet valve 6, and the several appurtenant actuating mechanisms therefor.

The concentrically mounted fuel injection valve 5 with the associated air starting mechanism thereof herein disclosed does not form part of the subject matter of the present application, except as the same or equivalent devices may be employed in co-operative association and combination with other parts of the valve controlling system, the subject matter of such fuel injection valve, per se, being fully shown and described in my separate co-pending application therefor, filed January 22, 1926, Serial No. 82,951, and the subject matter of such air starting mechanism, per se, being similarly disclosed in my separate co-pending application therefor, filed August 14, 1924, Serial No. 731,953. In the present instance the fuel injection valve 5 is designed to meter and time the injection or spraying of the fluid fuel within and throughout the combustion chamber of the engine cylinder 2, and to strain or filter such fluid fuel prior to and immediately preceding said injection or spraying thereof, and for this purpose is provided with a mechanically lifted valve stem 9 actuated by a rocker arm 10 fulcrumed at 11 upon the fuel injection valve 5 and having the outer bossed end 12 thereof engaged, at proper intervals or relative periods, by the inner end 13 of a fuel valve actuating lever 14 fulcrumed upon an eccentric 15 rigidly secured upon a longitudinally disposed rocker shaft 16, substantially midway the length of the same, said shaft being journalled for oscillation adjacent the ends thereof within bearings 17 fixedly secured in aligned spaced relation upon the upper end of the cylinder head structure 4.

Figure 4:
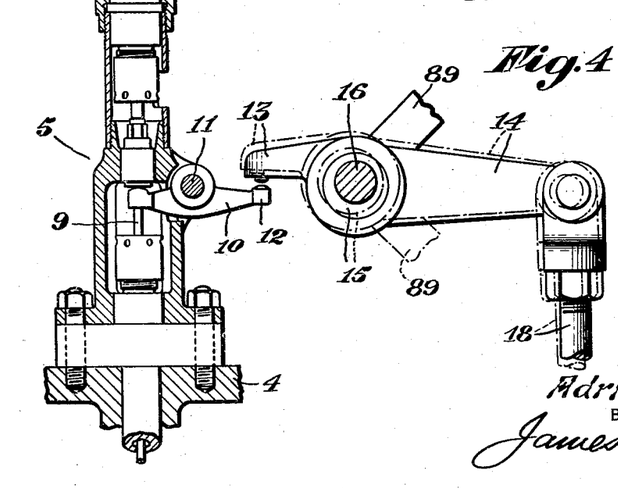
Fig. 4 is a transverse section taken through 4—4 of Fig. 3, illustrating in full lines the fuel injection valve actuating lever, as it would appear in a normally retracted position during four-cycle operation of the engine, and in dot and dash lines in a similar position during two-cycle or air starting operation of the engine.
Figure 5:
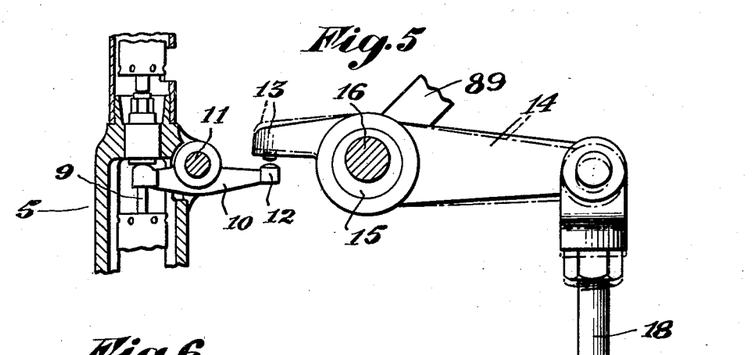
Fig. 5 is a similar section illustrating the valve actuating lever in the same full line position as that shown in Fig. 4 and in a fully governor retracted position in dot and dash lines.
Figure 6:
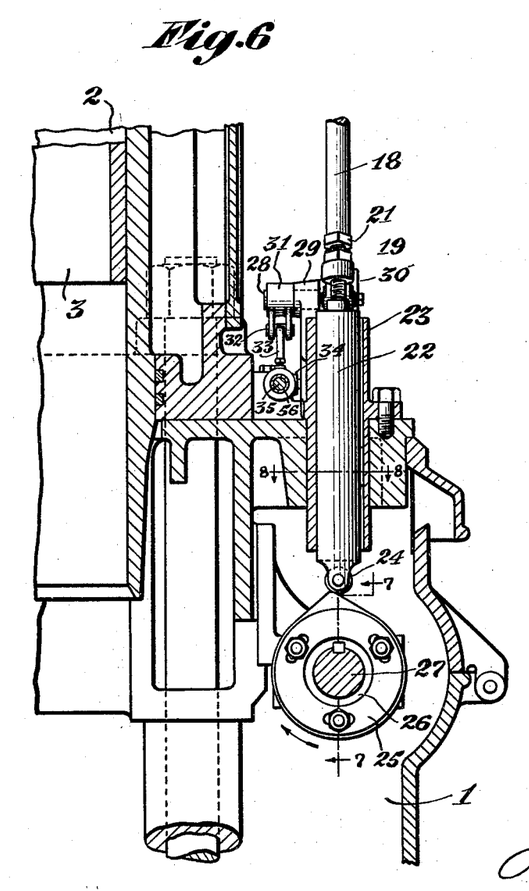
Fig. 6 is a fragmentary transverse vertical section of the fuel injection valve actuating cam mechanism taken through 6—6 of Fig. 1, with the said mechanism in a substantially fully actuated position.
Figure 7:
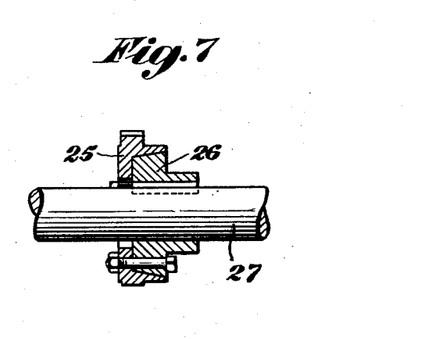
Fig. 7 is a fragmentary longitudinal vertical section of the same taken through 7—7 of Fig. 6.
Figure 8:
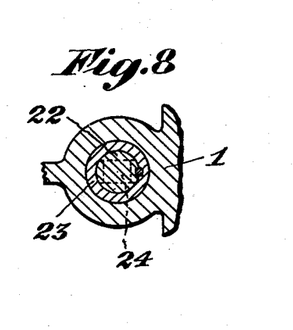
Fig. 8 is a fragmentary horizontal section taken through 8—8 of Fig. 6.

The valve actuating lever 14 is mounted and positioned upon the eccentric 15 in such a manner, to provide a slight normal clearance or slack between the inner end 13 of said lever and the outer bossed end 12 of the rocker arm 10, when the same are in the neutral or inactive positions indicated in full lines in Figs. 4 and 5, whereby the inertia of the moving parts of the valve actuating and controlling mechanism is overcome prior to the contacting or abutting of the lever 14 with the rocker arm 10 for the oscillation of the latter and the lifting of the valve stem 9.

The periodic lifting or actuation of the valve stem 9 is adjustably regulated and predeterminately controlled by the action of the engine governor, and for this purpose the outer end of the valve actuating lever 14 is pivotally connected by a depending push rod 18 to a tappet actuated and governor controlled lever 19 fulcrumed at one end upon an oscillative eccentric 20 and having the opposite end thereof interiorly threaded for the reception therein of an adjustable pin 21, the lower end of which normally abuts the upper end of a gravity tappet 22 guided for reciprocation and splined against rotation within a tappet guide 23 rigidly secure to the engine crank case 1. The tappet 22 is provided upon the lower end with a roller 24 that co-operates and is in continuous contact with a frusto-conically recessed cam 25 having tangential working faces and mounted for circumferential adjustment upon an interfitting frusto-conical hub 26 keyed or splined to the engine cam shaft 27, whereby the tappet 22 is periodically reciprocated at proper intervals.

Figures 1, 13, 14:
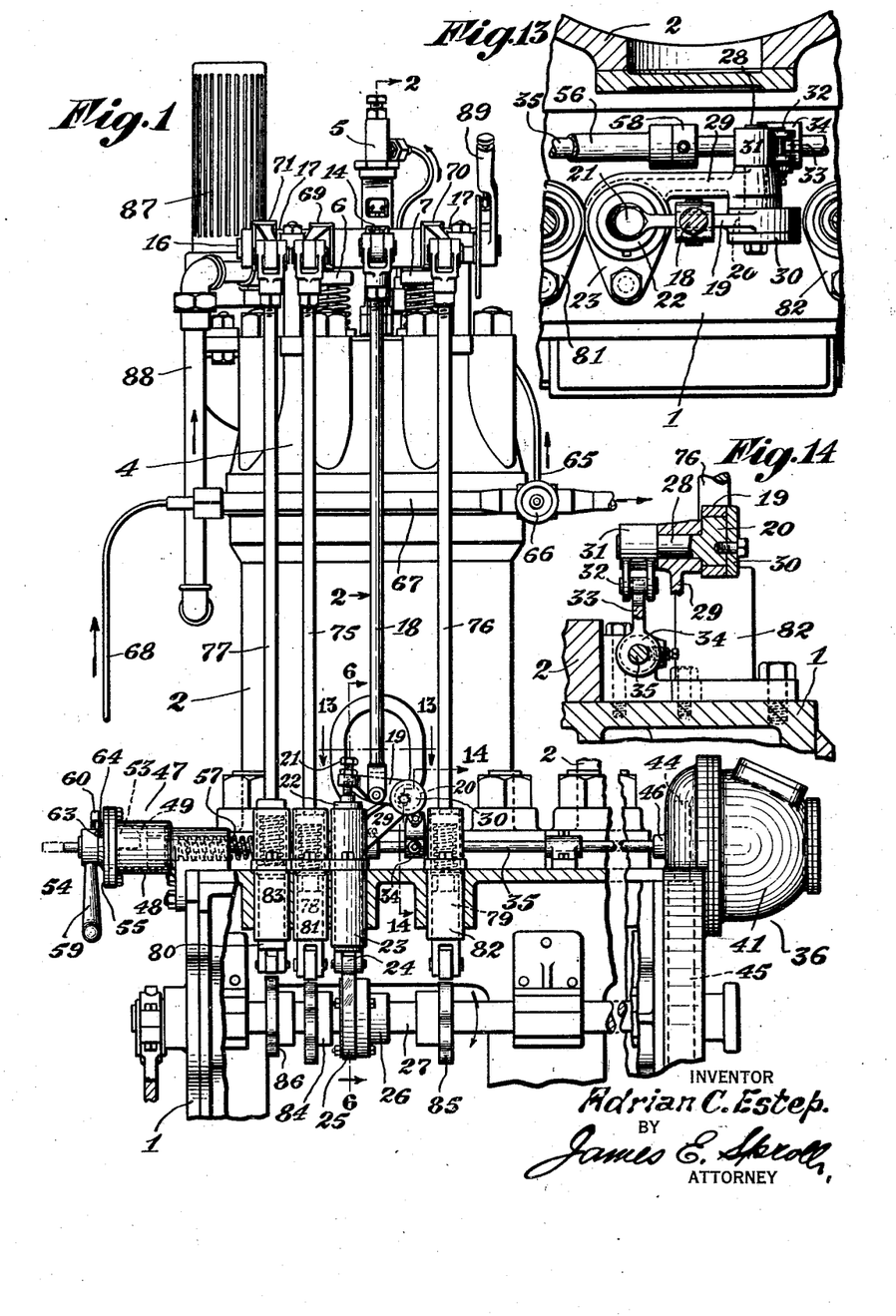
Figure 1 is a side elevation of an internal combustion engine equipped with valve actuating and controlling mechanism fabricated in accordance with the invention, certain parts being shown in section, and certain other parts broken away or omitted for clarity of illustration.
Fig. 13 is a fragmentary horizontal section of the fuel injection valve actuating and controlling mechanism taken through 13—13 of Fig. 1.
Fig. 14 is a fragmentary transverse vertical section of the same taken through 14—14 of Fig. 1.

Integral with or otherwise rigidly secured to the inner face of the oscillative eccentric 20 is a stub shaft 28 journalled for oscillation or partial rotation within an angular bracket extension 29 of the tappet guide 23, and fixedly secured to the outer face of the eccentric 20 is a disk 30, which in conjunction with the bracket extension 29 serves and functions thereat as a guide for the end of the lever 19 fulcrumed upon the eccentric 20, to thereby positively prevent axial movement of such lever upon the said eccentric, as will be manifest and apparent by referring to Figs. 13 and 14.

Rigidly secured upon the inner end of the stub shaft 28 in abutting relation to the bracket extension 29 is a downwardly directed bifurcated lever 31, the outer end of which straddles, and engages by a pin 32 fixedly secured therein, a notched or bifurcated upwardly directed extension 33 of an actuating collar 34 adjustably mounted and secured upon a longitudinally disposed reciprocative control shaft 35 concentrically mounted at the forward end thereof within the engine governor 36 for reciprocation thereby and control thereunder, and for this purpose the forward enclosed end of the control shaft 35 is provided with a non-rotative thimble 37 having a rotatable ball bearing thrust cap 38 mounted thereon, which latter is rotated by and guided for reciprocation within the forward portion of a guide sleeve 39 journalled for rotation at the forward end upon a radial thrust ball bearing 40, mounted within the forward end of the engine governor casing 41, and adjacent the opposite end thereof within a radial thrust ball bearing 42, fixedly secured within the casing 41 in proximity to the rear end thereof. Pivotally mounted upon the guide sleeve 39 in diametrically opposed relation thereon are ball carrying arms or bell cranks 43 having the inner terminals thereof normally abutting the thrust cap 38, as shown more clearly in Fig. 9, whereby the centrifugal action of such arms causes and concurrently controls axial or reciprocative movement of the control shaft 35. The guide sleeve 39 is driven and rotated by the engine cam shaft 27 through a pinion 44 rigidly secured to the rear end of the said guide sleeve meshing with a gear 45 similarly secured upon said cam shaft.

The control shaft 35 adjacent the forward end is supported for reciprocation within a bearing 46, formed upon the rear end wall of the governor casing 41, and at the opposite or rear end is slidably mounted for axial movement within a manually operable and adjustable governor load regulating mechanism 47, whereby the spring load on the engine governor 36 may be increased or decreased, to regulate and vary the speed and power of the engine, as desired.

Figures 9, 10, 11, 12:
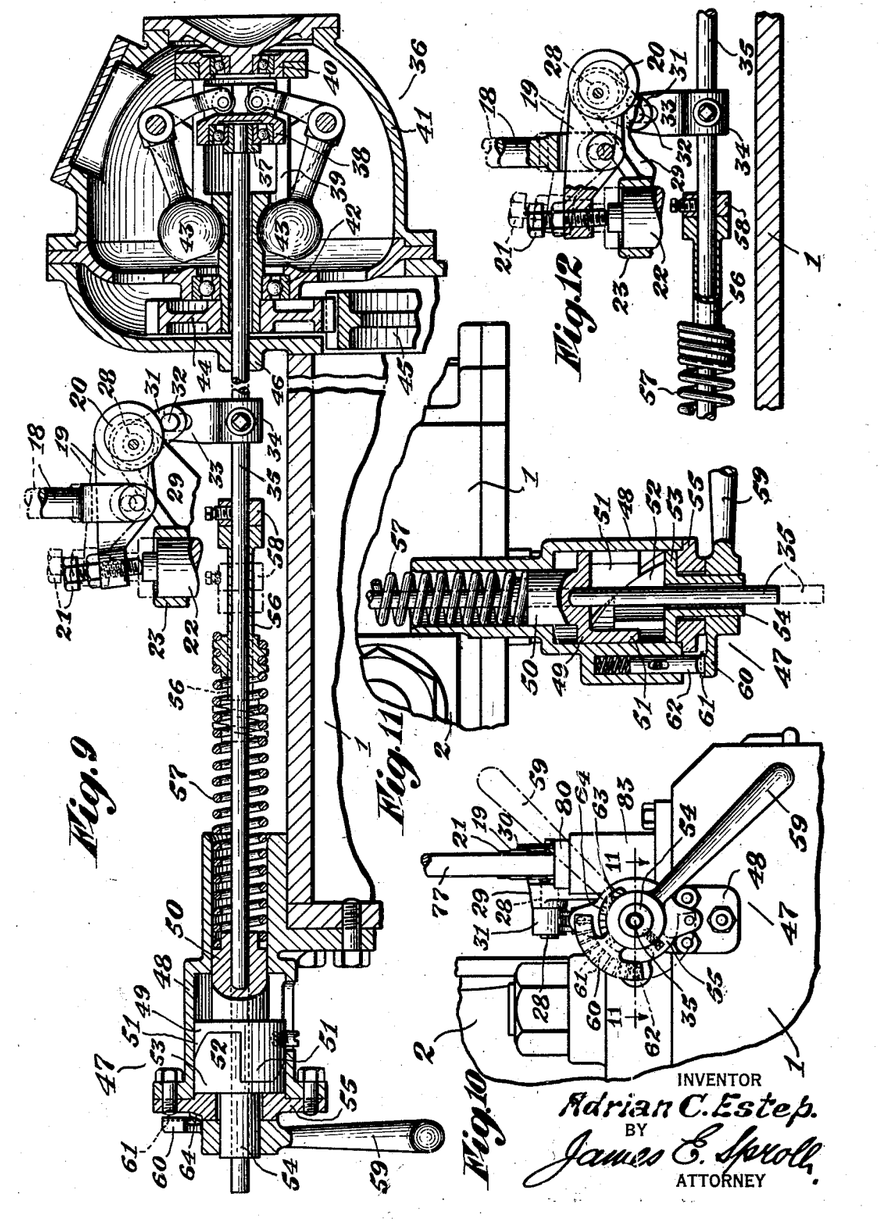
Fig. 9 is an enlarged fragmentary longitudinal vertical medial section of the fuel injection valve actuating and controlling mechanism, illustrating the engine governor and correlated mechanisms thereof in a maximum full speed position, with certain parts broken away or omitted.
Fig. 10 is an end elevation of the manually operable and adjustable mechanism provided to vary the spring load on the governor, illustrated in an inactive position in full lines and in a fully active position in dot and dash lines.
Fig. 11 is a fragmentary horizontal section of the same in a partially actuated position taken through 11—11 of Fig. 10.
Fig. 12 is a view substantially similar to Fig. 9, with parts omitted and with the mechanism in a minimum or low speed position, as it would appear when fully actuated by the engine governor.

The regulating mechanism 47 comprises a hollow bracket or housing 48, rigidly secured to the engine crank case 1, having an interior bore of two diameters, the larger of which extends rearwardly from the said engine crank case, while the smaller extends forwardly thereon, as shown more clearly in Figs. 9 and 11. Slidably disposed and positively retained against rotative movement within the rear or enlarged end of the hollow bracket 48 is a hollow cylindrical spring-pressed cam member 49 having a sleeve or hub extension 50 slidably disposed at the forward end within the reduced end of said hollow bracket 48, said sleeve extension 50 supports for independent reciprocation therein the control shaft 35 which extends therethrough as shown in Figs. 9 and 11. The hollow cylindrical walls of the cam member 49 are helically cut to provide rearwardly extending cams or jaws 51, which normally contact with, or abut, and engage correspondingly shaped forwardly extending complemental cams or jaws 52 similarly cut in the cylindrical walls of a cylindrical adjusting cam member 53 disposed for partial rotative movement and against axial movement within the rear end of the hollow bracket 48 and having a rearwardly extending sleeve or hub 54, which projects outwardly through a concentrically apertured cover 55 fixedly secured upon the rear end or terminal face of the said hollow bracket 48. The control shaft 35 extends through and projects beyond the sleeve 54, but is not supported thereby, as will be manifest and apparent by referring to Fig. 11.

Slidably and rotatably mounted for axial adjustment upon the control shaft 35 in spaced relation to the forward end of the hollow bracket 48 is a sleeve nut 56 exteriorly enlarged at the forward and rear ends, and having the said enlarged rear end thereof exteriorly threaded, or helically grooved, to fit within and adjustably engage a selected or predetermined number of forward coils of a helical governor compression spring 57 interposed between the sleeve nut 56 and the adjacent end of the cam member sleeve 50, whereon the rear end of said spring is seated and housed thereat within the forward end of the hollow bracket 48, as shown in Figs. 9 and 11. The primary function of the sleeve nut 56 is to change or vary the number of active coils in the governor spring 57 to adjust or regulate the range of compression of the said governor spring whereby a selected or predetermined number of such active coils will balance the centrifugal action of the engine governor 36 at all times, will positively prevent hunting of the said governor or uneven speed of the correlated engine, and will function to maintain the speed of such engine steady and constant. The sleeve nut 56 is initially adjusted and set within the governor compression spring 57 and upon the control shaft 35, in an obvious manner, to fit said spring to the range of the engine governor 36, and is maintained and retained against forward axial movement upon the control shaft by a compression collar 58 set and adjusted thereon, an an obvious manner, to compress the spring 57 to the required initial or primary compression for any selected or predetermined minimum engine speed, which latter is readily and quickly changed by increasing or decreasing such compression. In Figs. 9 and 12, the sleeve nut 56 is illustrated in full lines substantially in position of maximum adjustment in a forward direction, and in Fig. 9, is illustrated in dot and dash lines in position of similar adjustment in a rearward direction. In the former position the maximum number of active coils of the compression spring 57 are utilized, while, in the latter position the minimum number of active coils are utilized. Obviously, therefore, by fabricating the sleeve nut 56 and threadedly engaging the same within the compression spring 57, in the manner herein shown and described, an exceedingly fine and accurate adjustment or regulation of the range of said spring is readily had and obtained.

Rigidly secured to the outwardly projecting rear end of the adjusting cam member sleeve 54 and abutting the outer face of the cover 55 is a hand control lever 59 having on the inner end thereof a symmetrically disposed and diametrically opposed arcuate segmental portion 60 provided upon the inner face with a series of radially disposed notches 61, which, selectively receive and seat therein the outer wedge-shaped end of a spring-pressed locking pin 62 slidably mounted and positively retained against rotation within the cylindrical wall of the enlarged rear end of the hollow bracket 48, as shown in Fig. 11, to thereby restrainingly engage and positively retain the control lever 59 in any selected or desired adjusted position within the range of movement of the same. An indicating pointer 63 formed upon the hub of the control lever 59 in conjunction with a graduated arcuate portion 64 formed upon the outer face of the cover 55 adjacent thereto serve and function thereat to expedite the adjustment or setting of the said control lever for any desired or selected engine speed.

In Figs. 1, 9 and 10 the control lever 59 is illustrated in a position of minimum engine speed, in Fig. 11 said control lever is shown in a position midway minimum and maximum engine speeds, and in Fig. 10 the control lever is shown in dot and dash lines in a position of maximum speed. When the control lever 59 is moved from the position indicated in full lines to the position indicated in dot and dash lines in Fig. 10, or to any position intermediate thereof, as indicated in Fig. 11, the governor compression spring 57, through the media of the rotative cam adjusting member 53 and the axially movable cam member 49, is compressed to the maximum with a maximum movement of the control lever 59, or is partially compressed with a partial movement of such control lever. The amount of maximum or partial compression above described is based and is dependent upon the respective and relative settings of the sleeve nut 56 and correlated compression collar 58 thereof, which conjointly govern, control and determine the amount of initial or primary compression imposed upon the spring 57, which latter compression determines the minimum speed of the engine, as herein set forth.

Manifestly, therefore, the full range of engine speed from the selected minimum to the maximum is obtained by manipulating the control lever 59, whereby the spring load on the engine governor 36 is increased or decreased to regulate and vary the speed and power of the engine, as desired.

The fuel injection valve 5 is supplied with fluid fuel by a delivery conduit 65 connected at the outer end to a valve 66 interposed within a fluid fuel manifold 67, of the correlated engine, which manifold receives fluid fuel under high pressure from a common supply pipe 68 connected at the intake end thereof to a fluid fuel pump, not shown.

Figure 3:
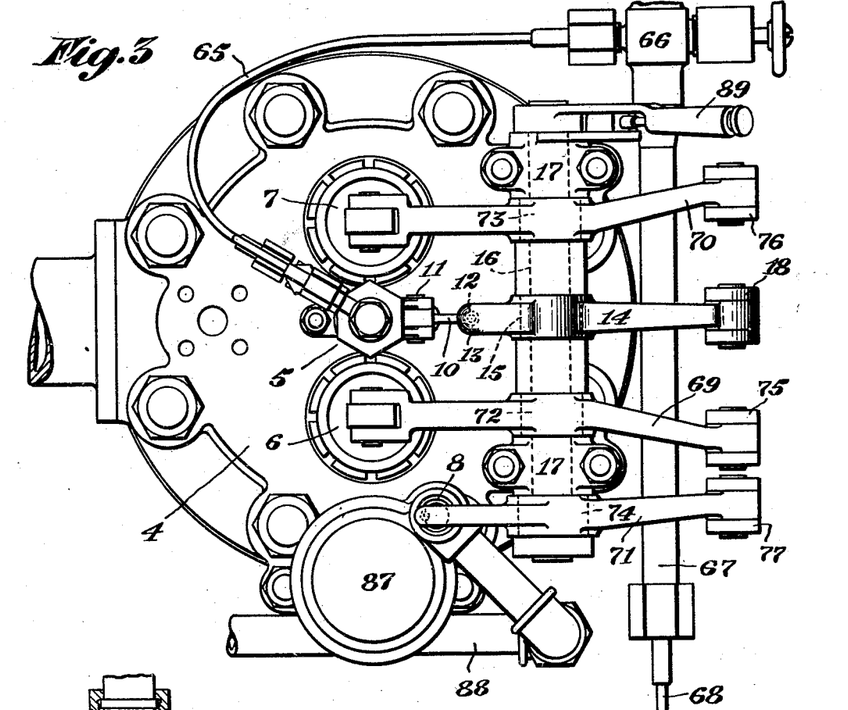
Fig. 3 is a top plan view of the engine cylinder head structure and the appurtenant valve actuating mechanism thereof.

The air inlet valve 6, the exhaust valve 7 and the air starting timing valve 8 function in the manner set forth in my aforementioned co-pending application for air starting mechanism, but, for the purposes of a ready understanding of the manner in which said valves co-act and function with the correlated fuel injection valve 5, a brief description of the actuating mechanisms thereof is here appended. The valves 6, 7 and 8 are actuated at proper intervals or relative periods by valve actuating levers 69, 70 and 71, respectively, fulcrumed upon eccentrics 72, 73 and 74, respectively, rigidly secured to the rocker shaft 16 in spaced relation thereon, as shown in Fig. 3. Pivotally connected to the outer ends of the valve actuating levers 69, 70 and 71 are depending push rods 75, 76 and 77 seated at their lower ends within spring-pressed tappets 78, 79 and 80 guided for reciprocation within tubular guides 81, 82 and 83 rigidly secured to the engine crank case 1, and which co-operate with cams 84, 85 and 86, fixedly secured upon the engine cam shaft 27. The air inlet valve receives starting air through the air starting timing valve 8 and combustion air through an air louver 87, while the air starting timing valve 8 receives starting air or fluid pressure through a supply pipe 88.

A starting handle 89 rigidly secured to one end of the rocker shaft 16 is designed and provided to rock or oscillate said shaft, to thereby bring the several valve levers eccentrically mounted thereon, into position for either four-cycle action during normal operation, or into position for two-cycle action during air starting periods. With the starting handle 89 in an elevated position the several valve levers are disposed in position for four-cycle action, while, with the said starting handle in a lowered or depressed position the said valve levers are disposed in position for two-cycle action. In the depressed or two-cycle position of the starting handle the fulcrum point of the fuel valve actuating lever 14 is elevated, whereupon the weight of the push rod 18 pivotally connected to the outer end thereof is exerted thereat to elevate the inner end 13 of the said lever moving the same away from the outer bossed end 12 of the rocker arm 10, as indicated in dot and dash lines in Fig. 4, so that the maximum oscillative movement of the lever 14, during two-cycle operation of air starting periods, is insufficient to permit the inner end 13 thereof contacting with the said bossed end 12, thus rendering the fuel injection valve 5 inoperative during such operations or periods. Concurrently with the elevating of the fulcrum of the lever 14 the fulcra of the valve levers 69, 70 and 71, with the correlated push rods and tappets thereof are lowered to take up the normal or extra clearance of said tappets upon their respective cams, as more fully shown and described in the co-pending application, aforementioned, whereat the air starting timing valve 8 is actuated in unison with the air inlet valve 6 and the exhaust valve 7 is actuated in sequence therewith at proper relative intervals for two-cycle action during air starting periods.

In four-cycle action or normal operations the starting handle 89 is elevated, thus lowering the fulcrum point of the fuel valve actuating lever 14, whereat the inner end 13 thereof is depressed and moved into close proximity to the outer bossed end 12 of the rocker arm 10, as shown in full lines in Figs. 4 and 5, so that the minimum oscillative movement of the lever 14 is sufficient to permit the inner end 13 thereof contacting with the said outer bossed end 12 of the said rocker arm 10, to thus lift the valve stem 9 and actuate the fuel injection valve 5 in sequence with, and at proper intervals relative to the air inlet valve 6 for four-cycle action or normal operation of the associated engine. Simultaneously with the lowering of the fulcrum point of the lever 14 the fulcra of the valve levers 69, 70 and 71 are elevated, whereat their respective push rods and tappets are elevated and the normal or extra clearance between said tappets and their respective cams is re-established, as more fully shown and described in the co-pending application, aforementioned, whereupon the air inlet valve 6 and the exhaust valve 7 are actuated in sequence at proper intervals for four-cycle action and the air starting timing valve 8 is rendered inoperative during normal operation.

In Figs. 1 and 9, the several elements of the valve actuating and controlling mechanism are shown in a position of full speed or maximum power, as the same would appear when the engine is at rest, the governor controlled lever 19 and the correlated eccentric 20 thereof being elevated whereby the push rod 18 is also elevated and the clearance between the inner end 13 of the lever 14 and the outer end 12 of the rocker arm 10 is reduced to the normal, as indicated in full lines in Figs. 4 and 5, thus permitting the cam 25 to elevate or lift the valve stem 9 to the maximum during normal opertion of the engine while, with the governor controlled lever 19 and the eccentric 20 thereof in the lowered position indicated in Fig. 12 the push rod 18 is lowered and the clearance between the inner end 13 of the lever 14 and the outer end 12 of the rocker arm 10 is increased, as indicated in dot and dash lines in Fig. 5, thereby decreasing or reducing the effective lift of the valve stem 9 to the minimum due to such increased slack or clearance existent between the adjacent ends of the rocker arm 10 and the lever 14, as will be manifest and apparent.

In Figs. 1, 9 and 10 the hand control lever 59 is shown in low speed position, and if it is desired to increase the speed of the engine, said lever is elevated as shown in dot and dash lines in Fig. 10, or in full lines in Fig. 11, to thus compress the spring 57 and increase the spring load upon the engine governor 36, to thereby retard the action of the same, it will therefore be obvious that by manipulating the control lever 59 any desired engine speed within a certain well defined range of speeds may be readily and quickly obtained, said range of speeds being based and dependent upon the amount of initial or primary compression imposed upon the compression spring 57 by the compression collar 58, in the manner and for the purposes hereinbefore described.

By providing considerable normal slack or lost motion in or excess travel for the valve motion parts interposed between the valve stem 9 and the cam 25, as herein shown and described, such normal slack or excess travel readily permits and positively insures of getting all the parts of the valve actuating mechanism in motion, the inertia of the same overcome, and the taking up of any excessive wear or slack of such parts before the valve stem 9 is opened or lifted, as will be manifest and apparent. Further, by interposing the eccentrically mounted lever 19 between the lower end of the push rod 18 and the gravity tappet 22, in the manner herein disclosed, the ratio of lift of the valve stem 9 to the lift of the tappet 22 is substantially one to six (1 to 6), and such construction of the valve motion parts in conjunction with the provision of considerable normal slack therein or excess travel therefor, as aforementioned, permits of the use and employment of a cam contour of reasonable proportions, preferably having tangential working faces as shown, whereby excessive wear of and shock upon the valve motion parts is avoided and smooth action of the cam roller 24 upon the cam 25 is positively assured at all times. It will be obvious from the foregoing description and by referring to the accompanying drawings, that by fabricating the valve motion parts in the manner herein shown and described, that a very delicate, fine and accurate adjustment of the lift of the valve stem 9 is had and obtained, which delicate adjustment is necessary and essential for the reason that the maximum or greatest lift of said valve stem at any time is relatively small or slight.

Figure 2:
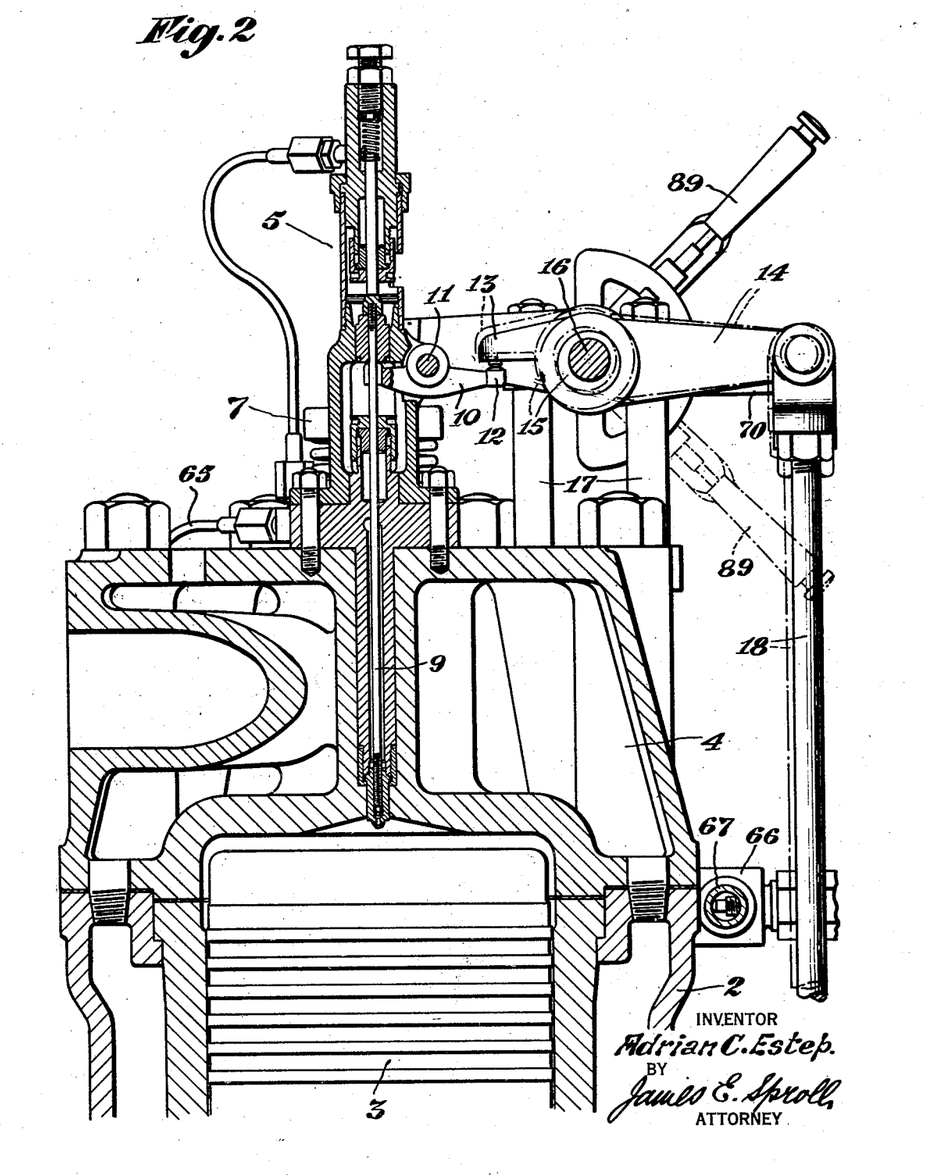
Fig. 2 is an enlarged central transverse vertical section of the engine cylinder head structure and correlated fuel injection valve thereof taken through 2—2 of Fig. 1, illustrating the said valve in a partially opened position to correspond to the relative position of the associated engine piston shown at or about compression dead center.

In the operation of the valve actuating and controlling mechanism, assuming that the valve controlling system of the engine is in position for four-cycle or normal operation, as disclosed in full lines throughout the several views, the governor controlled lever 19 is oscillated upon the eccentric 20, by the tappet 22 periodically actuated by the cam 25, to the position indicated in dot and dash lines in Figs. 9 and 12, whereby the push rod 18 is reciprocated and imparts oscillative movement to the lever 14, which latter imparts similar movement to the rocker arm 10 to periodically lift the valve stem 9, as indicated in full lines in Fig. 2, whereat the fuel injection valve 5 is opened to inject and spray a charge of fluid fuel within the combustion chamber of the engine cylinder 2, as the speed of the engine increases the control shaft 35 is moved rearwardly through the action of the engine governor 36 causing the actuating collar 34 to move the lever 31 rearwardly also, thus partially rotating the eccentric 20 and lowering the fulcrum of the governor controlled lever 19 with the push rod 18 thereof, whereupon the clearance or slack normally existent between the adjacent ends of the lever 14 and rocker arm 18 is increased and the lift of the valve stem 9 is decreased in consequence to maintain the engine at the desired speed or power output. As the speed of the engine decreases by reason of the foregoing the action of the spring 57 returns the control shaft 35, the governor 36 and the actuating collar 34 to a normal position, which latter moves the lever 31 forwardly to reverse the rotation of the eccentric 20 and elevate the fulcrum of the governor controlled lever 19 and the push rod 18, whereat normal clearance or slack between the adjacent ends of the lever 14 and rocker arm 10 is re-established to obtain the maximum lift for the valve stem 9.

While I have herein shown and described my invention with sufficient detail to enable those skilled in the art to understand the mode of construction and the principles involved, it is to be understood that there is no intentional limitation herein to the specific form and precise details of construction of the invention shown and described, except as expressly defined by the appended claims, and that various modifications of said construction may be resorted to without departing from the invention or the benefits derivable therefrom. I also desire to have it understood that certain features of the invention herein shown and described may be employed in other combinations than those herein shown.

Having thus fully described my invention, what I claim as new and desire to secure by Letters Patent is:—

1. The combination with the power cylinder of an internal combustion engine, of a fuel injection valve for said power cylinder, a lever to lift the stem of the valve, an oscillative lever eccentrically mounted at one end, a rod connecting the outer end of said lifting lever with said oscillative lever at a point substantially midway its length, a cam actuated tappet for oscillating said oscillative lever, and means operable by the engine for changing the fulcrum of the eccentrically mounted lever to vary the lift of the said valve stem.

2. The combination with the power cylinder of an internal combustion engine, of a fuel injection valve for said power cylinder, a rocker arm having an operative connection with the stem of the valve for lifting the same, an actuating lever for the rocker arm, an oscillative lever eccentrically mounted at one end, a depending push rod pivotally connected at one end to the outer end of said actuating lever and at the opposite end to said oscillative lever midway the length thereof, a cam actuated tappet normally abutting the free end of said eccentrically mounted lever for periodically oscillating the same to lift the said valve stem, and means operable by the engine for changing the fulcrum of said oscillate lever to vary the lift of said valve stem.

3. The combination with the power cylinder of an internal combustion engine, of a fuel injection valve for said power cylinder, a rocker arm having an operative connection with the stem of the valve for lifting the same, an actuating lever for the rocker arm having lost motion therebetween, an oscillative lever eccentrically mounted at one end thereof, a push rod pivotally connecting the outer end of said actuating lever with said oscillative lever at a point substantially midway its length, a cam actuated tappet for oscillating said eccentrically mounted lever, and means operable by the engine to vary the amount of said lost motion for varying the lift of the said valve stem.

4. The combination with the power cylinder of an internal combustion engine, of a fuel injection valve for said power cylinder, a rocker arm having an operative connection with the stem of the valve for lifting the same, an eccentrically mounted actuating lever for the rocker arm, manually operable means to elevate the fulcrum of said actuating lever for rendering said rocker arm inactive, an oscillative lever eccentrically mounted at one end thereof, a push rod interconnecting the outer end of said actuating lever with said oscillative lever midway its length, a cam actuated tappet for oscillating said eccentrically mounted lever, and means operable by the engine for changing the fulcrum of said lever to vary the lift of the said valve stem.

5. The combination with the power cylinder of an internal combustion engine, of a fuel injection valve for said power cylinder, a rocker arm for lifting the stem of the valve, an actuating lever for the rocker arm having lost motion therebetween, an oscillative lever pivoted at one end thereof, a rod interconnecting the free end of said actuating lever with said oscillative lever at a point approximately midway its length, a cam actuated tappet for oscillating said oscillative lever, and adjustable means interposed between said last named lever and tappet for varying the amount of said lost motion.

6. The combination with the power cylinder of an internal combustion engine, of a fuel injection valve for said power cylinder, a lever for lifting the stem of the valve having lost motion therebetween, an oscillative lever pivoted at one end thereof, a rod interconnecting the free end of said lifting lever with said oscillative lever approximately midway its length, a cam actuated tappet for oscillating said last named lever, and adjustable means interposed between the same and its correlated tappet for varying the amount of said lost motion.

7. The combination with the power cylinder of an internal combustion engine, of a fuel injection valve for said power cylinder, a rocker arm for lifting the stem of the valve, an actuating lever for the rocker arm having lost motion therebetween, an oscillative lever pivotally mounted at one end for oscillative movement, a push rod pivotally connected at one end to said actuating lever and at its opposite end to said oscillative lever midway its length, a cam actuated tappet for periodically oscillating said oscillative lever, and an adjustable pin interposed between said last named lever and tappet for varying the amount of said lost motion.

8. The combination with the power cylinder of an internal combustion engine, of a fuel injection valve for said power cylinder, a rocker arm for lifting the stem of the valve, an actuating lever for the rocker arm having lost motion therebetween, an oscillative lever pivotally mounted at one end for oscillative movement, a push rod pivotally connected at one end to said actuating lever and at its opposite end to said oscillative lever midway its length, a cam actuated tappet for periodically oscillating said oscillative lever, and a pin adjustably mounted within the free end of said last named lever and normally abutting said tappet for varying the amount of the lost motion aforesaid.

9. The combination with the power cylinder of an internal combustion engine, of a fuel injection valve for said power cylinder, a rocker arm for lifting the stem of the valve, an actuating lever for the rocker arm having lost motion therebetween, an oscillative lever eccentrically mounted at one end thereof, a rod interconnecting the outer end of said actuating lever with said oscillative lever approximately midway its length, a cam actuated tappet for oscillating said oscillative lever, means operable by the engine for changing the fulcrum of the eccentrically mounted lever to vary the lift of said valve stem, and adjustable means interposed between the oscillative lever and its correlated tappet for varying the amount of the lost motion aforesaid.

10. The combination with the power cylinder of an internal combustion engine, of a fuel injection valve for said power cylinder, a rocker arm for lifting the stem of the valve, an eccentrically mounted actuating lever for the rocker arm having lost motion therebetween, manually operable means to elevate the fulcrum of said actuating lever for rendering said rocker arm inactive, an oscillative lever eccentrically mounted at one end thereof, a push rod interconnecting the outer end of said actuating lever with said oscillative lever approximately midway its length, a cam actuated tappet for oscillating said oscillative lever, means operable by the engine for changing the fulcrum of said last named lever to vary the lift of said valve stem and adjustable means interposed between the oscillative lever and its correlated tappet for varying the amount of the lost motion aforesaid.

11. The combination with the power cylinder of an internal combustion engine, of a fuel injection valve for said power cylinder, a series of interconnected compounded levers for actuating said valve having lost motion therebetween with the outermost lever of said series eccentrically mounted, a cam for actuating said eccentrically mounted lever, adjustable means interposed between said cam and said lever for varying the amount of the lost motion aforesaid, and means operable by the engine for changing the fulcrum of said eccentrically mounted lever to vary the opening movements of said valve.

12. In combination with the power cylinder of an internal combustion engine, of a fuel injection valve for said power cylinder, a series of interconnected compounded levers for actuating said valve having lost motion therebetween, a cam actuated tappet for said series at the outer end thereof, and a cam normally abutting said tappet for actuating the latter having a tangential working face the major portion of which is utilized to take up the lost motion aforesaid and the minor portion of which is utilized to effect opening movements of said valve.

In testimony whereof I affix my signature.

ADRIAN C. ESTEP.